Dec. 9, 1924.
W. J. SHARP
FISHHOOK
Filed May 31, 1924
1,518,166
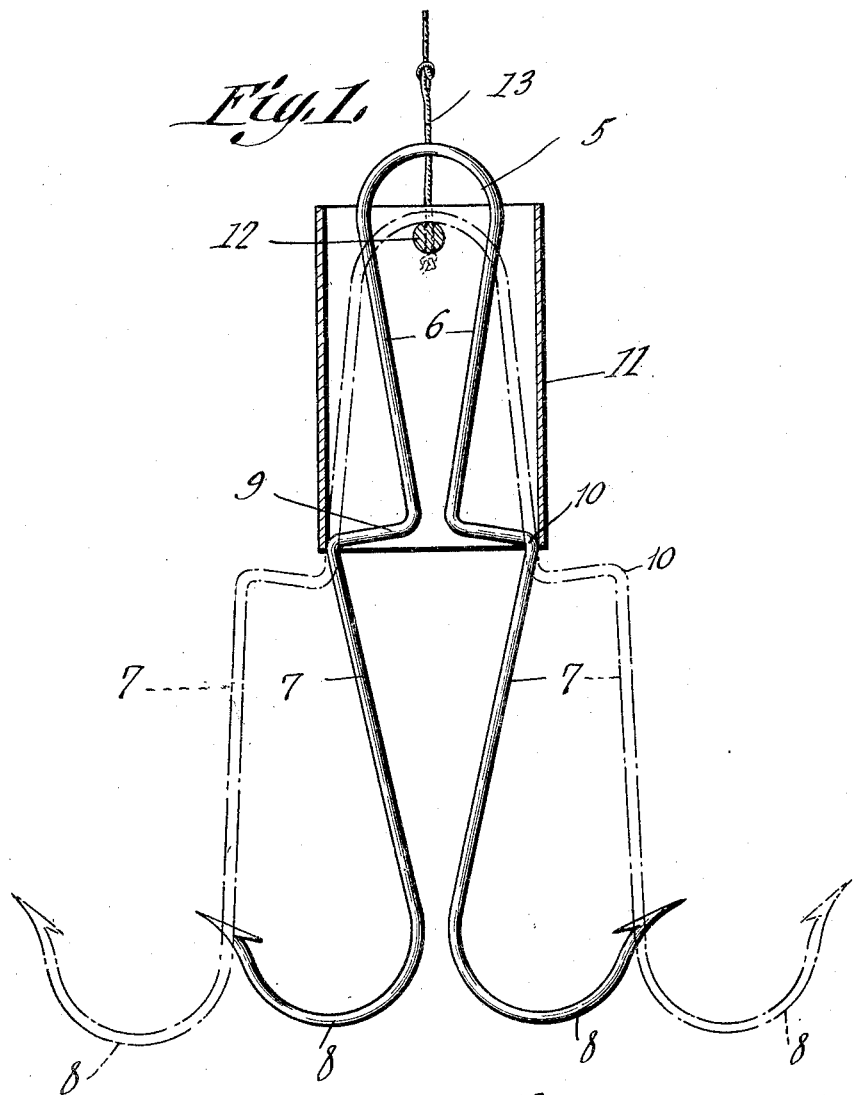
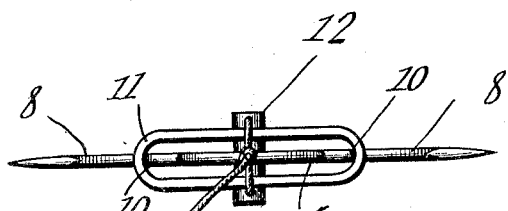
Inventor
W. J. Sharp

UNITED STATES PATENT OFFICE.

WARREN JACKSON SHARP, OF MERIDIAN, MISSISSIPPI.

FISHHOOK.

Application filed May 31, 1924. Serial No. 717,038.

*To all whom it may concern:*

Be it known that I, WARREN J. SHARP, a citizen of the United States, residing at Meridian, in the county of Lauderdale and State of Mississippi, have invented a new and useful Fishhook, of which the following is a specification.

This invention relates to fish hooks or the like and aims to provide novel means whereby the hook portions may be sprung laterally when a pull is brought to bear thereon, to insure against the hook portions becoming dislodged.

Another important object of the invention is to provide a hook of this character which will be automatic in its operation, novel means being provided for holding the prongs of the hook normally in their inactive positions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a fish hook constructed in accordance with the invention, the guard portion thereof being shown in longitudinal section.

Figure 2 is a plan view thereof.

Referring to the drawing in detail, the hook includes a body portion formed of a length of resilient wire material bent intermediate its ends to provide a loop 5 and opposed arms 6, the arms 6 being formed integral with the leg portions 7 of the prongs 8.

The portions between the arms 6 and leg portions 7 are relatively straight as indicated at 9, defining shoulders 10 adapted to be engaged by the guard 11 to normally hold the prongs 8 in their inactive positions.

As shown, the guard 11 is formed preferably of sheet metal and is of a length to engage the shoulders 10 and hold the leg members 7 and prongs formed at the end thereof in their inactive positions. The walls of the guard support a pin 12 which affords means whereby a fishing line, such as indicated at 13 may be connected to the fish hook so that a person may control the movements of the fish hook, in the water.

The loop member 5 is positioned around the pin 12 in such a way that the pin 12 acts as a stop for the body portion of the hook when a pull is exerted on the body portion to insure against the body portion of the hook being pulled through the bars.

In the use of the device, the hook is baited in the usual way and the leg members 7 moved towards each other until the shoulders 10 may move to a position within the guard 11. It is obvious that when a fish catches the bait and exerts a pull on the prongs thereof, the shoulders are moved from their positions within the guard 11 and the leg portions 7 automatically moved away from each other, due to the resiliency of the metal of which they are formed, to the end that the prongs will deeply embed themselves in the mouth of the fish to insure against the fish releasing itself.

I claim:—

In a fish hook, a body portion including leg members, constructed to move outwardly, said leg members having hooks formed at their free ends, said leg members having shoulders formed intermediate their ends, a guard member positioned on the body portion, a pin connecting the walls of the guard member and disposed between the legs of the hook, said hook adapted to move into engagement with the pin to restrict movement thereof, and said shoulder adapted to engage one end of the guard to restrict movement of the leg members after they have expanded to their active positions.

In testimony that I claim the foregoing as my own, I have hereto affixed my signature in the presence of two witnesses.

WARREN JACKSON SHARP.

Witnesses:
R. H. SEYMOUR,
VALLIE MURPHREE.